(12) United States Patent
Braungardt et al.

(10) Patent No.: US 8,787,425 B2
(45) Date of Patent: Jul. 22, 2014

(54) SIGNAL PROCESSING ARRANGEMENT AND SIGNAL PROCESSING METHOD

(75) Inventors: Lutz Braungardt, Nehren (DE); Martin Opitz, Regensburg (DE); Thomas Reisinger, Regenstauf (DE)

(73) Assignee: Continental Automotive GmbH, Hannover (DE)

( * ) Notice: Subject to any disclaimer, the term of this patent is extended or adjusted under 35 U.S.C. 154(b) by 281 days.

(21) Appl. No.: 13/145,149

(22) PCT Filed: Jan. 18, 2010

(86) PCT No.: PCT/EP2010/050516
§ 371 (c)(1),
(2), (4) Date: Jul. 19, 2011

(87) PCT Pub. No.: WO2010/081901
PCT Pub. Date: Jul. 22, 2010

(65) Prior Publication Data
US 2011/0280283 A1  Nov. 17, 2011

(30) Foreign Application Priority Data
Jan. 19, 2009  (DE) .......................... 10 2009 005 119

(51) Int. Cl.
 H04B 1/00  (2006.01)
(52) U.S. Cl.
 USPC ........... 375/148; 375/260; 375/272; 375/285; 375/343; 375/367
(58) Field of Classification Search
 USPC .................. 375/148, 260, 272, 285, 343, 367
 See application file for complete search history.

(56) References Cited

U.S. PATENT DOCUMENTS

| 5,228,055 A | 7/1993 | Uchida et al. ..................... 375/1 |
| 6,085,077 A | 7/2000 | Fields et al. ........... H03H 17/02 |
| 6,393,451 B2 * | 5/2002 | Leyonhjelm et al. ......... 708/420 |
| 7,372,907 B2 * | 5/2008 | Munoz et al. ................. 375/260 |
| RE41,797 E * | 10/2010 | Kumar et al. ................. 375/349 |
| 2002/0070845 A1 | 6/2002 | Reisinger et al. ....... B60R 25/00 |
| 2004/0001688 A1 * | 1/2004 | Shen ............................... 386/46 |
| 2007/0009013 A1 | 1/2007 | Misra et al. ................... 375/146 |

FOREIGN PATENT DOCUMENTS

| DE | 102006042345 A1 | 3/2008 | ............. H04B 7/00 |
| DE | 102007028732 A1 | 12/2008 | ............. H04J 13/02 |
| EP | 1564904 A1 | 8/2005 | ............. H04B 1/707 |
| WO | 2010/081901 A1 | 7/2010 | ............. B60R 25/00 |

OTHER PUBLICATIONS

International Search Report and Written Opinion for Application No. PCT/EP2010/050516 (17 pages), Apr. 19, 2010.
Hong Wang et al.: "Channelized Receiver with WOLA Filterbank" RADAR, 2006. CIE ' 06. International Conference on, IEEE, P1, Oct. 1, 2006, Seitan 1-3, XP031073525 ISBN: 978-0-7803-9582-4 (3 pages).

* cited by examiner

*Primary Examiner* — Dhaval Patel
(74) *Attorney, Agent, or Firm* — King & Spalding L.L.P.

(57) ABSTRACT

A signal processing arrangement is designed to process a digitalized phase-modulated and/or digitalized spreaded input signal (1) and has a complex channelizer (2) which despreads and/or demodulates the input signal (1) in the time range on the basis of a folding operation.

18 Claims, 7 Drawing Sheets

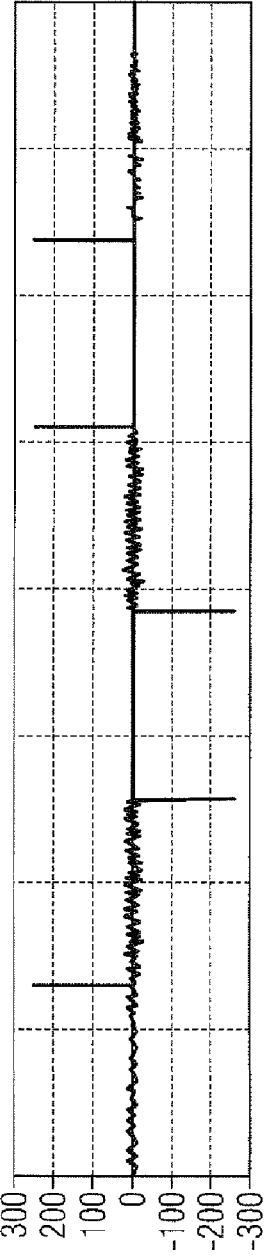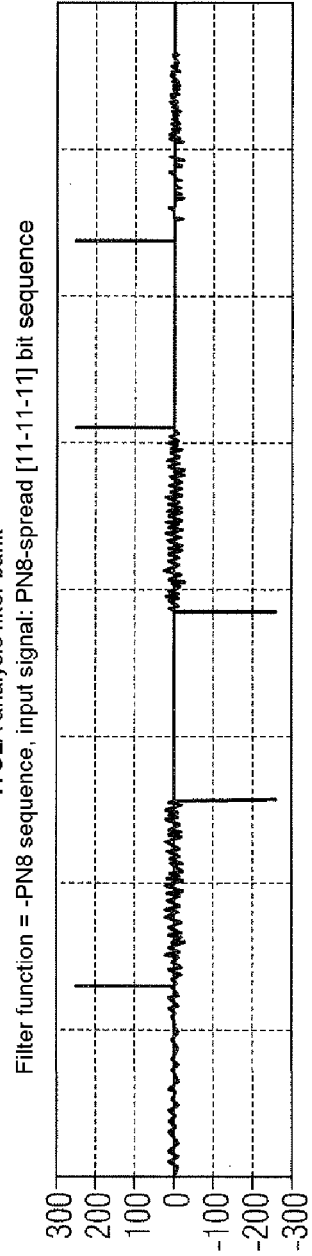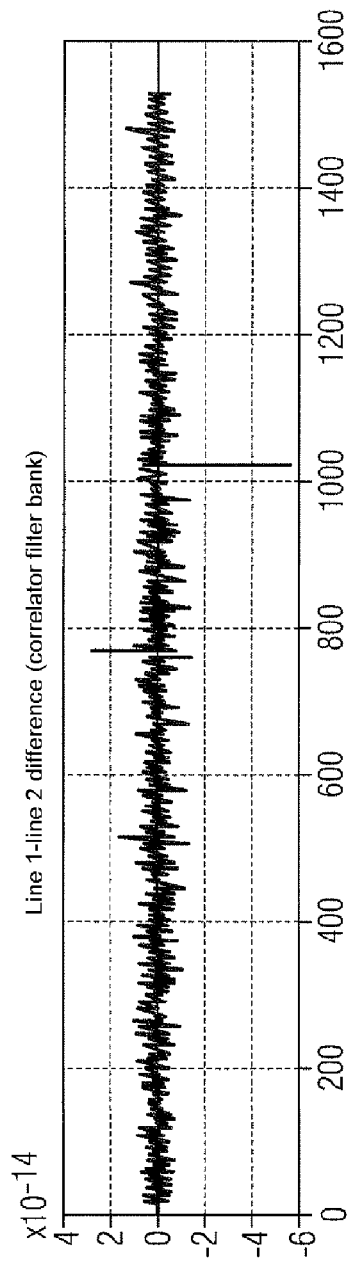
FIG 7

SIGNAL PROCESSING ARRANGEMENT AND SIGNAL PROCESSING METHOD

CROSS-REFERENCE TO RELATED APPLICATIONS

This application is a U.S. National Stage Application of International Application No. PCT/EP2010/050516 filed Jan. 18, 2010, which designates the United States of America, and claims priority to German Application No. 10 2009 005 119.8 filed Jan. 19, 2009, the contents of which are hereby incorporated by reference in their entirety.

TECHNICAL FIELD

The invention relates to a signal processing arrangement for a radio locking system and to a method for signal processing for a radio locking system in a motor vehicle.

BACKGROUND

Particularly in motor vehicles, a large number of functions are, even today, initiated or controlled by means of remote controls. Usually, this involves the use of a radio link in license-free frequency bands for the transmission from and to the motor vehicle. For vehicle entry and, by way of example, also for starting the engine, these are what are known as "remote keyless entry" systems (RKE systems for short), as are used for radio central locking, for example. RKE systems have now become the standard solution not only for convenient locking and unlocking of a vehicle but also for further convenience functions. This is done by means of radio control, which is usually integrated in a vehicle key and which, furthermore, is used to activate or deactivate not only the locking and unlocking of the doors and the trunk but also the theft prevention and the engine immobilizer as appropriate. Further functions, such as convenient opening and closing of windows, sun roofs, sliding doors or tailgates may likewise be integrated as well. A further convenience function and safety function is the activation of the headlamp lighting of the vehicle. Additional safety is provided by what is known as an emergency button which is integrated in the key and which, upon being pushed, initiates an audible and visual alarm on the vehicle.

In this case, RKE systems of this kind operate—depending on requirements—with unidirectional or bidirectional communication in the range of worldwide approved ISM frequencies (ISM=Industrial, Scientific, Medical). By way of example, further features are protected data transmission with optionally increased safety as a result of a challenge-response authentication method (bidirectional) and low power consumption. In addition, further applications allow the functions of an RKE system to be personalized for selected people. The range of such RKE systems is usually up to 100 m.

A further radio communication based system is what is known as the PASE system. In this case, PASE stands for PAssive Start and Entry and describes a keyless entry and starting system. In the case of this keyless vehicle entry system, the driver merely needs to carry an identification encoder (ID) and is afforded entry to the vehicle by simply touching the door handle. As soon as the driver is inside the vehicle, the engine can be started by pushing a button. When the driver leaves the vehicle, the PASE system locks the vehicle either automatically or when a button is pushed. The identification pass for the driver replaces conventional mechanical or radio controlled keys and is intended to provide the driver with maximum convenience and the simplest handling. In this case too, there is again the option of personalization for selected people, and multichannel bidirectional data transmission is usually employed which likewise takes place wirelessly and in encrypted form, for example in the range of worldwide approved ISM frequencies.

In addition, systems are also becoming established in the field of motor vehicles today which have further functions such as the transmission of state information. Such systems generally operate over relatively long ranges, usually several 100 m. Examples of these are what are known as telestarting, i.e. starting an engine from relatively great distances, or the remote control of a vehicle heater, an automatic air-conditioning system and so on. Further examples of the use of radio links with relatively long ranges other than those for the described RKE and PASE systems relate to status information for the motor vehicle which can be retrieved from a relatively great distance, such as the current locking state, the current interior temperature and results of technical system checks (engineering checks). It is also desirable for alarm reports to be transmitted over a relatively great distance.

All functions which require wireless data transmission over relatively great distances are also embraced by the generic term "long range applications". One aim of long range applications is to divide data transmission or communication over distances of approximately 1 km. When (bidirectional) radio links are implemented over such distances, there is, particularly in the USA, the problem that high radio powers (up to 1 watt, 30 dBm) are permissible only for large frequency bandwidths (>500 kHz). When such ranges are implemented in radio locking systems for motor vehicles, however, only relatively small bandwidths (and accordingly low data rates (1 kbit/sec)) are customary, which meets the requirement for high receiver sensitivities. In addition, it is also necessary to implement a high transmission power, however. This is because although small signal bandwidths require low data rates, they result in high bit sensitivities. This is not enough in the link budget, however, since it is additionally also necessary to implement high transmission powers. This is hampered by the regulations in the USA. Spread spectrum technology is the solution in this case. The narrowband (& low-rate) data signal is transmitted in spread (wideband & high-rate) form, the transmission power can be increased (FCC), and in the receiver the relatively low chip sensitivity resulting from the spreading is raised back to the bit sensitivity of a narrowband system by the despreading.

SUMMARY

According to various embodiments, an arrangement and a method for signal processing, particularly for radio signals, can be specified which implement high bandwidth and high receiver sensitivity inexpensively and effectively.

According to an embodiment, a signal processing arrangement can be designed to process a digitized phase-modulated and/or digitized spread input signal and has a complex channelizer which takes a convolution operation as a basis for despreading and/or demodulating the input signal in the time domain.

According to a further embodiment, the channelizer can be designed to despread and demodulate the input signal simultaneously. According to a further embodiment, the channelizer may have a multiplier, which multiplies the input signal by $e^{j2\pi ft}$, and a filter, which filters the product provided by the multiplier using a filter transfer function $h(t)$, wherein f represents the frequency and t represents the time. According to a further embodiment, the input signal can be BPSK-modulated and the channelizer can be set up to perform BPSK-demodulation on the input signal. According to a further embodiment, the input signal can be DSSS- or CMDA-spread and the channelizer can be set up to perform DSSS- or CMDA-despreading on the input signal. According to a further embodiment, the signal processing arrangement may have at least one further channelizer, connected in parallel with the one channelizer, having a different center frequency, which produces a multiplicity of output signals, and which has a selection device which selects at least one output signal from the multiplicity of the output signals. According to a further embodiment, the selection device may have a maximum-likelihood decision-maker. According to a further embodiment, the selected channel may have a phase estimation device which performs phase estimation for the input signal using at least one of the output signals. According to a further embodiment, the selected channel may have a frequency estimation device which performs frequency estimation for the input signal using at least two phase estimations for the output signals. According to a further embodiment, a complex channelizer can be used to take a convolution operation as a basis for despreading and/or demodulating the input signals in the time domain. According to a further embodiment, the input signals can be despread and demodulated simultaneously. According to a further embodiment, the input signal can be multiplied by $e^{j2\pi ft}$, and the resultant product is filtered using a filter transfer function h(t), wherein f represents the frequency and t represents the time. According to a further embodiment, the input signals can be BPSK-modulated and BPSK-demodulation is performed on the input signals. According to a further embodiment, the input signals can be DSSS- or CDMA-spread and DSSS- or CDMA-despreading is performed on the input signals. According to a further embodiment, at different center frequencies, complex channalizers can be used to take convolution operations as a basis for despreading and/or demodulating the input signals in the time domain, wherein a multiplicity of output signals are produced, and in which one output signal is selected from the multiplicity of the output signals. According to a further embodiment, the selection can be made on the basis of a maximum-likelihood decision. According to a further embodiment, phase estimation for the input signal can be performed using at least one of the output signals. According to a further embodiment, frequency estimation for the input signal can be performed using at least two phase estimations.

According to yet another embodiment, a complex channelizer can be used for despreading and/or demodulating an input signal on the basis of a convolution operation in the time domain.

BRIEF DESCRIPTION OF THE DRAWINGS

The invention is explained in more detail below with reference to the exemplary embodiments illustrated in the figures of the drawings, with identical elements being provided with the same reference symbols. In the drawings:

FIG. 7 shows the response of an appropriately programmed simulation of a filter arrangement for the WOLA (Weighted Overlap and Add) analysis in a configuration as a correlator;

DETAILED DESCRIPTION

According to various embodiments, a signal processing arrangement has a programmable filter arrangement, in which the filter arrangement is designed to use an M-ary PSK (Phase Shift Keying) method to demodulate modulated input signals or to use a CDMA (Code Division Multiplex Access) code multiplex method, such as a DSSS (Direct Sequence Spread Spectrum) spreading method, to despread spread input signals or to despread and demodulate the input signals simultaneously.

According to various embodiments, in a method for signal processing, a filter arrangement processes such input signals as are modulated by means of an M-ary PSK method and are spread by means of a CDMA or DSSS method. The method comprises the steps of the input signals being despread by the filter arrangement or the input signals being demodulated by the filter arrangement, or the input signals being simultaneously despread and demodulated by the filter arrangement.

In this case, the transmission of spread signals with appropriate implementation of spreading technology links together the demands for the highest possible bandwidth and high receiver sensitivity. The spread factors required in this context for the signals which are to be transmitted are in the range from 10 to 500.

The arrangements and methods described below use the efficient structures of conventional and inexpensive filter arrangements in order to demodulate and/or despread a modulated and spread signal, as used in radio locking systems for motor vehicles, particularly in one step. In this case, the description makes reference by way of example to a DSSS-spread signal modulated by means of binary phase shift keying (BPSK), wherein it is also possible to use CDMA spread sequences and other M-ary PSK modulations without restrictions.

Although the prior art discloses DSSS arrangements, these are not suitable for applications in radio-based vehicle locking systems, since they are provided, by way of example, for continuous-time transmission of relatively large volumes of data (satellite reception by means of DSSS, voice transmission by means of CDMA) or tap-proof data transmission. By contrast, DSSS-based radio locking systems are supposed to allow the most efficient possible handling of short messages when small volumes of data are transmitted, for example, wherein short reaction times, high performance efficiency and a low space requirement are demanded. Furthermore, radio locking systems for motor vehicles do not allow extensive buffer storage of data, which means that data processing in real time is necessary.

Figure 1:
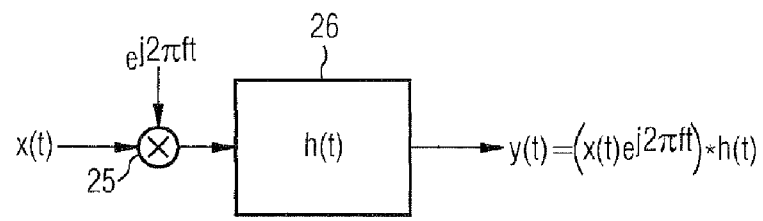
FIG. 1 shows the circuit diagram for a channelizer for use in an arrangement according to various embodiments.

FIG. 1 shows the design of a complex channelizer as may be used in an arrangement according to various embodiments and a method according to various embodiments. Such a channelizer 25 comprises a multiplier 25 with a downstream filter 26. A digitized input signal 1 [x(t)] has its frequency shifted by means of multiplication by $e^{j2\pi ft}$, for example, in the multiplier 25 and is then filtered by the filter 26 using an impulse response h(t).

The convolution operation which is required for demodulating and despreading is actually very complex. The various embodiments now involve the use of a channelizer in order to efficiently implement said operation. This particularly involves the use of a complex channelizer in order to efficiently implement a PSK demodulator, correlator (for despreading) and also a simultaneous PSK demodulator and correlator (for despreading). Accordingly, the various embodiments allow the use of already existing efficient filter implementations for PSK demodulation, correlation or simultaneous PSK demodulation and correlation.

One particular embodiment of an efficient filter implementation of this kind is the mathematically equivalent implementation of N parallel complex channelizers within an analysis filter bank structure. Within this structure, a single channel is then used to implement PSK demodulation and/or correlation, for example.

Within a filter bank, the various channels usually use the same "prototype low-pass impulse response". Accordingly, in line with the various channels, the input signal is evaluated a plurality of times, with the various evaluations differing only in terms of their fundamental frequency. Using a maximum-likelihood decision on the basis of the various channels at the output of the synthesis filter bank, for example, it is then accordingly possible to implement (coarse) frequency estimation, with a systematic f residual error remaining.

The complex implementation of the channelizer (that is to say the consideration of the in-phase and quadrature-phase components) allows the phase of the transmitter carrier signal to be determined in the receiver. This makes it possible to present the coherency required for PSK demodulation in terms of transmitter and receiver oscillator frequency. The evaluation of at least two particular phase values allows (precise, fine) frequency error determination with practically no remaining systematic error.

Figure 2:
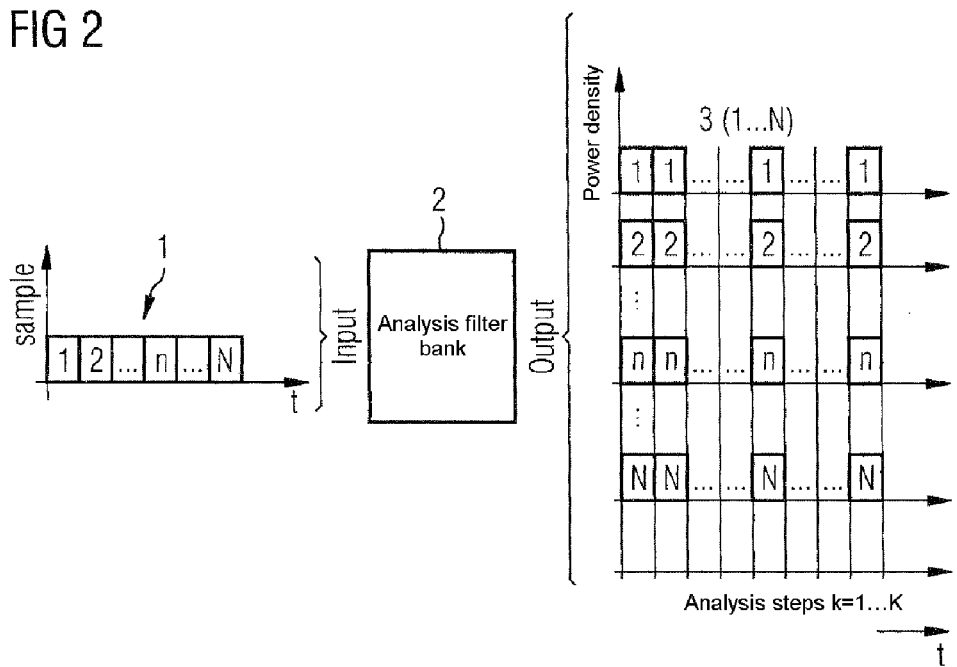
FIG. 2 shows a diagram of the general mode of operation of a multichannel filter arrangement for frequency analysis of a digitized input signal.

FIG. 2 shows an exemplary diagram of the mode of operation of a multichannel filter arrangement (filter bank) for analyzing a digitized input signal (INPUT). A digitized input signal 1 of this kind is processed in a filter analysis arrangement 2 (in the filter arrangement) to produce output signals (OUTPUT) 1 . . . N. In this case, the digitized input signal 1 for the filter arrangement is based on a respective stipulated number of samples in the time domain. In line with sampling theorem, this input signal 1 should contain frequency components up to half the sampling frequency (sampling rate).

In the filter arrangement, the input signal 1 is divided into N different subranges 1 . . . N. The signal component (the amplitude) of the relevant frequency subrange is output as an output signal 1 . . . N. This is done once per analysis step 1 . . . k in each case.

Figure 3:
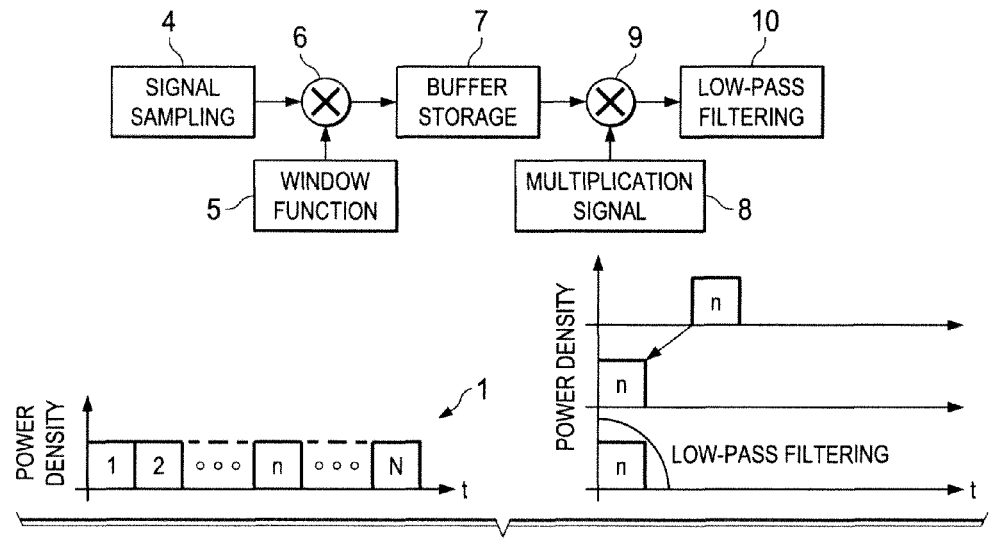
FIG. 3 shows a diagram of the flow of the signal filtering shown in FIG. 1 and a path in the flow of the frequency analysis shown in FIG. 2.

FIG. 3 uses a schematic signal flowchart to show the flow of the frequency analysis in the filter analysis arrangement 2 shown in FIG. 2. The signal flowchart contains a function block for signal sampling 4, a function block for a window function 5, a first multiplier 6, a function block for buffer storage 7, a function block for a multiplication signal 8 (exp $(-2\pi f_n t)$), a second multiplier 9 and a function block for low-pass filtering 10.

The filter analysis arrangement processes a time period for a stipulated number of samples (see FIG. 1). Following the multiplication (weighting) of this period using a customary window function (for example Hamming or Blackman), what is known as the analysis window is obtained, which is buffer stored in the function block for buffer storage 7 for the purpose of subsequent processing. Next, the frequency components of each frequency subrange n for this analysis window are ascertained. For this purpose, the analysis window is multiplied by the signal frequency $f_n$ (exp($-2\pi f_n t$)) by the second multiplier 9. This mixes the relevant frequency subrange n into the baseband corresponding thereto with the center frequency f=0, this process being executed in complex fashion—as explained.

The subsequent low-pass filtering in the function block for low-pass filtering 10 distinguishes the subrange n from the adjoining range (n+1) (and the signal components $2*f_n$ resulting from the mixing are rejected (see bottom right of FIG. 2)). Such filtering corresponds to convolution with the filter impulse response h(t) in the time domain:

$$y(t) = \int_{1 \ldots L} h(t-\tau) \cdot x(\tau) d\tau$$

wherein the number of samples in this case is denoted by L. From the above integral, it can be seen that the filtering (convolution) corresponds to multiplication of h(t) by x(t) and to subsequent integration over the entire window length L. For a low-pass filter, h(t) is in this case dimensioned such that the integration rejects high frequency components. In normal operation of the filter arrangement, the focus is on optimum demarcation of the individual frequency subbands from one another. The process described is executed for each frequency subrange $n \in \{1 \ldots N\}$.

In this case, the length of the analysis window is subsequently assumed to be the same as the length of the low-pass filter (filter length), but without this being intended to restrict general validity.

The subsequently presented arrangements and methods are suitable for application to input signals which have been modulated by means of the M-ary PSK method. To improve clarity, but again without any intended restriction of general validity, BPSK modulation is assumed. The same applies to the spreading of the input signals using the DSSS and CDMA methods. While the explanations relate to DSSS, they can likewise be applied to CDMA spread sequences—but with somewhat different properties. By way of example, it is thus conceivable for various DSSS-PNx sequences to be allocated (for CMDA purposes) in order to allow a reduction in susceptibility to interference from other simultaneous users of a system of the same kind.

Figure 4:
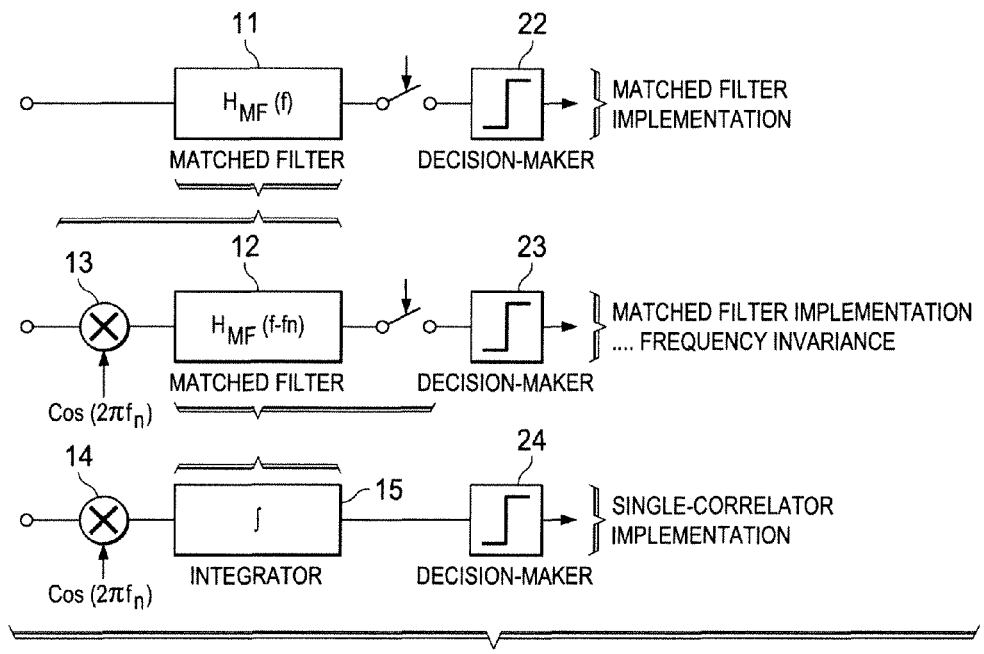
FIG. 4 shows a schematic diagram of the arrangement of an ideal binary signal detector for BPSK demodulation.

FIG. 4 shows a schematic diagram of the arrangement of an ideal binary signal detector for BPSK demodulation. The arrangement comprises two matched filters (coordinated filters) 11 and 12, two multipliers 13 and 14, an integrator 15 and also decision-maker units 19, 20, 21. The $1^{st}$ row (top) shows a matched filter implementation for an ideal binary signal decision-maker. Given an appropriate choice of matched filter function H_MF(f), BPSK demodulation is possible. A matched filter operation can have its frequency shifted by $f_n$ if the input signal is likewise shifted by $f_n$. This is shown at the bottom right of FIG. 3, where the frequency is shifted by means of multiplication by the multiplier 13. For the special case that frequency conversion to baseband takes place (f_BPSK=$f_n$), the filter function obtained is a low-pass function. If there is no symbol pulse shaping—corresponding to an infinite RF bandwidth—at the time of this filtering with H_MF(f–f$_n$), a square-wave signal h_MF(t) is obtained for H_MF(f–f$_n$) in the time domain. In this case, the filter function H_MF(f–f$_n$) changes to integration from kT to (k+1)T together with the symbol sampling at the times kT (shown in FIG. 4 as decision-maker units 22 and 23 following the matched filters 11 and 12) (see third row, bottom in FIG. 3). The multiplier 14 and the integrator 15 finally form a correlator.

On the basis of the formal similarities between the presented BPSK demodulator implementations and the already described functional model of a filter arrangement, the various embodiments also allow the latter to be used for implementing a BPSK demodulator. If the effects of windowing using a window function (Hamming or Blackman, etc.) are initially disregarded, that is to say that the content of the analysis window function shown in FIG. 3 is assumed to be 1 (time or sampling period=analysis window), then a multiplication chip and a filter chip remain in the channelizer or a path of the filter arrangement. The prerequisites for implementing a BPSK demodulator therefore exist, always assuming ideal symbol clock recovery.

Figure 5:
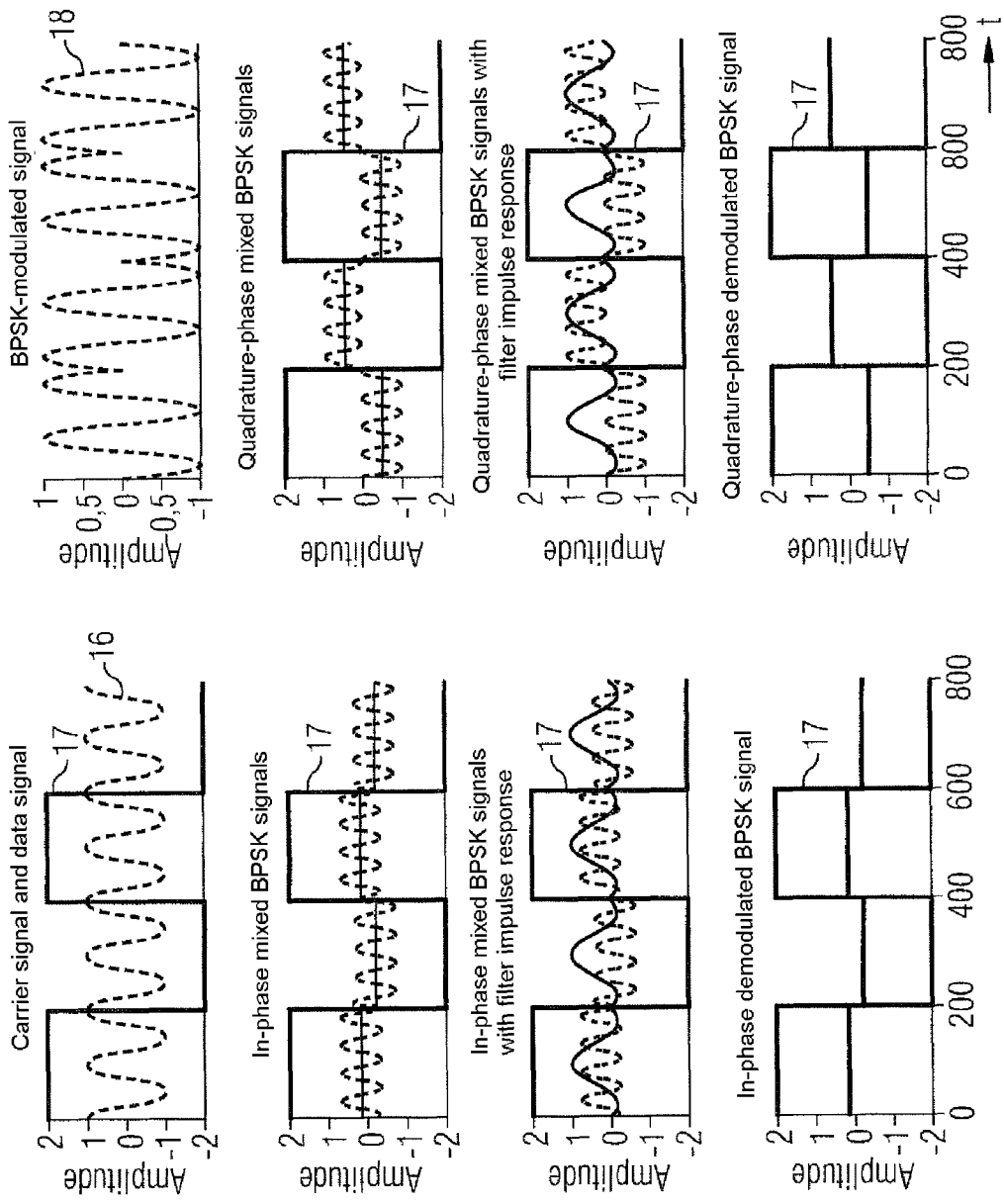
FIG. 5 shows a schematic diagram of the signal processing steps in the channelizer.

FIG. 5 shows a schematic diagram of the signal processing steps in the channelizer or the filter arrangement shown in FIGS. 2 to 5. The top left of FIG. 5 shows the unmodulated carrier signal 16 and the modulating signal 17. On the basis of the method of BPSK modulation, these form the BPSK-modulated RF data signal 18 (see FIG. 4, first row on the right). If the filter arrangement, as in the present case, is intended to be used for BPSK demodulation, the impulse response of the filter arrangement H_FB(f) is configured in line with the matched filter requirements of a BPSK demodulator. A frequency shift in the BPSK signal to baseband simplifies the design of H_FB(f). For this reason, a low-pass function is subsequently used for the BPSK demodulation within the filter arrangement.

If a BPSK signal conversion to baseband is now performed, the input signals shown in the second row in FIG. 5 are obtained (the signal 17 is also included as a reference). The low-pass filtering eliminates the "2f" components, and the DC component (corresponds to the modulating signal 17) remains. The low-pass filter is designed in line with the requirements for optimum BPSK demodulation. In this case, an optimum ratio is obtained between the number of samples which are processed by the low-pass filter (filter length) and the number of signal samples which correspond, from the point of view of time, to a single symbol. For BPSK demodulation on its own, this ratio is approximately 1. This is in contrast to BPSK demodulation with simultaneous DSSS despreading, as described further below. In this case, this ratio corresponds to approximately the spread factor M.

Rows 3 and 4 in FIG. 5 illustrate the results of the demodulation process by way of example. In this case, the filter length (L=200) has been chosen to be the same as the symbol period by way of example. For the filter function, a low-pass filter function (Sinc(x)) has been chosen by way of example (for the sake of better clarity). Following recovery of the symbol clock, a filter process (multiplication and integration from 0 . . . L, corresponds to τ=0) is executed per symbol. The resulting output signal, which is then a single discrete-time value per symbol, is shown in row 4 (bottom of FIG. 5).

There follows an explanation of how the filter arrangement can be used as a correlator (spreading of input signals). The explanations assume basic knowledge of a DSSS system. The signal spreading involves a single bit being spread using a spread sequence PNx of length M. For the purpose of despreading, the received signal needs to be correlated in suitable fashion in the receiver with the spread sequence PNx, which is known therein. If an already demodulated but still spread signal s$_{DSSS}$(t) is assumed, the correlation can be defined as:

$$y(t) = \int_{1 \ldots L} h(t-\tau) \cdot x(\tau) d\tau$$

Within the integral, the input signals s$_{DSSS}$ and PNx are integrated in a manner shifted by the value τ with respect to one another. The stipulation of the correct signal shift is called synchronization in this case. For τ, a periodicity with the spread sequence length M is then obtained for the correlation peaks of interest.

Comparison of the correlation integral with that of the convolution (see above) shows a formal similarity. Both are distinguished only by an arithmetic sign and by the integration variable. The positive arithmetic sign for the correlation dispenses with the mirroring of a function for the ordinate (y axis). The following relationship is obtained for the case in which correlation is intended to be expressed by means of convolution:

$$z_{xy}(\tau) = x(-\tau) * y(\tau)$$

Accordingly, a channelizer or an analysis filter arrangement can be used, in accordance with various embodiments, as a correlator for despreading DSSS input signals. A prerequisite for this is that the internal mixing frequency is f$_n$=0. In this context, the filter of the analysis filter arrangement is programmed not with a low-pass impulse response but rather with the PNx sequence.

Figure 6:
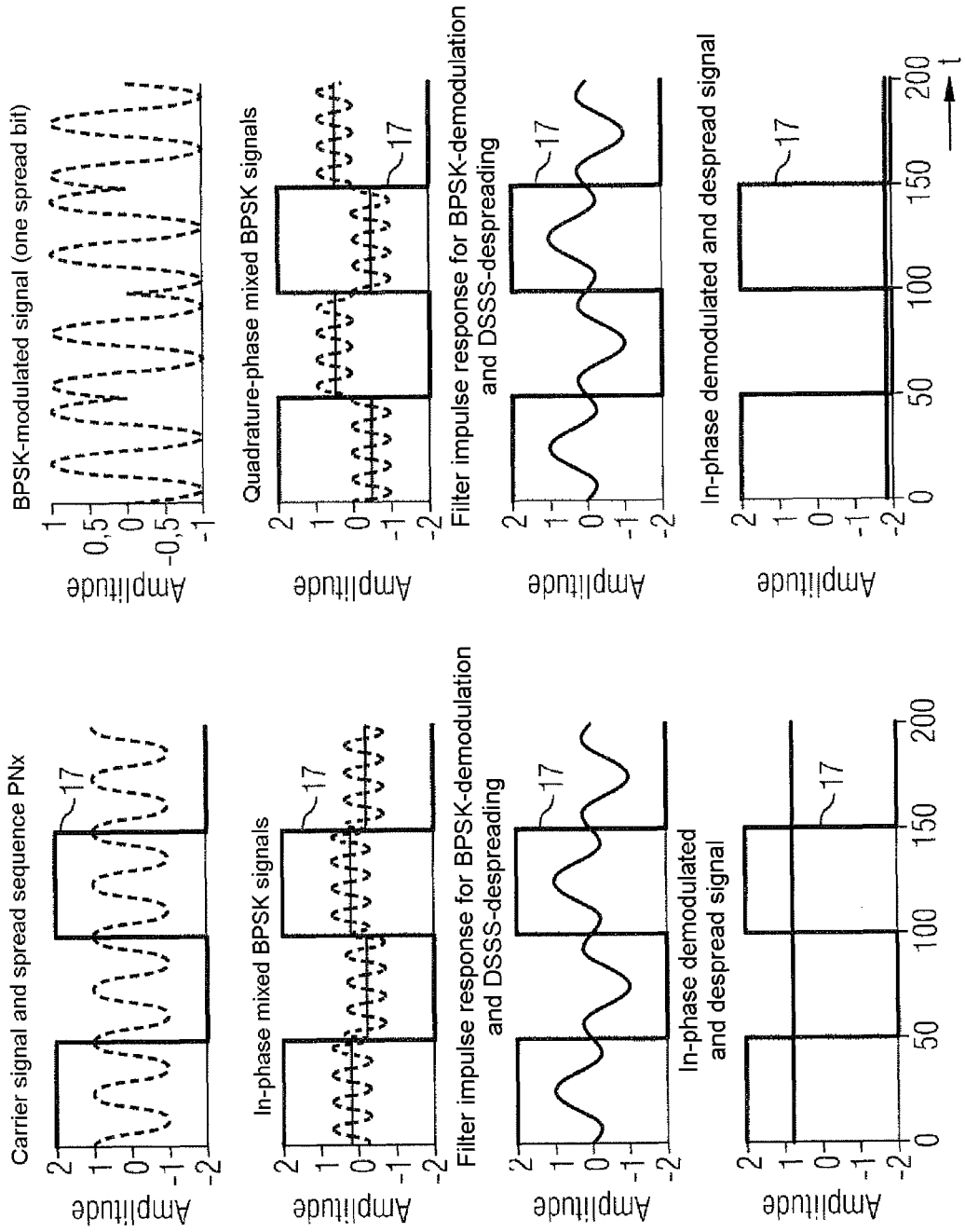
FIG. 6 shows a schematic diagram of the simultaneous BPSK demodulation and DSSS despreading for a digitized input signal.

There follows a description of how the BPSK demodulation and the DSSS correlation can be executed simultaneously in accordance with various embodiments. The formal similarity between convolution (filtering) and correlation (despreading) can also be used to advantageously combine the BPSK demodulation and the DSSS/CDMA correlation (despreading) with one another. In order to perform simultaneous BPSK demodulation and DSSS/CDMA despreading, the filter length L needs to be chosen such that it corresponds approximately to the number of signal samples from the input signal which, when considered over time, correspond to a modulated and spread bit of the input signal. The length L of the filtering accordingly needs to accommodate M modulated symbols (chips) which have been sampled at a particular sampling rate. The entire filter impulse response then comprises a concatenation of single matched filter impulse responses which are needed for the BPSK demodulation. The arithmetic sign of the relevant PNx chip governs the arithmetic sign of the filter function element—required for the demodulation—of each individual chip. FIG. 6 illustrates the simultaneous BPSK demodulation and DSSS despreading of a digitized input signal. Rows 1 and 2 in FIG. 6 first of all show the input signals which occur within the analysis filter arrangement.

These have already been explained in appropriate fashion above for BPSK demodulation on its own.

The previous modulating signal 17 (see also FIG. 5) is now regarded as a PNx sequence in the representation PNx=1, 0, 1, 0. The considered length of the filter is also L=200 in this case by way of example. However, these 200 samples now accommodate M modulated chips (symbols). Row 3 in FIG. 6 shows a possible filter impulse response for simultaneous BPSK demodulation and DSSS despreading. This function replaces the previous matched filter impulse response for BPSK demodulation on its own (see FIG. 5). It comprises a concatenation of single matched filter impulse responses. The arithmetic sign of the impulse response elements corresponds to the arithmetic sign of the individual PNx chips (symbols). Following integration over the filter length L, the correlation value shown in row 4 in FIG. 6 is obtained. The signal 17 is used as a reference in all the diagrams in turn.

The use of the analysis filter arrangement on the basis of the methods described above additionally results in the opportunity for use which is described below. Since an analysis filter arrangement is always calculating different frequency options $f_n$ (n=1 ... N), it is possible to realize a frequency estimation if the frequency is not known precisely. In this case, a maximum likelihood decision is used to select the most probable signal at the output. In line with the number N of channels in the filter arrangement, a certain residual frequency error always remains, depending on the system. Frequency estimation when using the filter arrangement as a correlator (despreading) is conducted as described below. If a correlation sequence is multiplicatively linked to a frequency error (PNx(t)*s(t, f)), this can be regarded as BPSK modulation. The mixing in the filter arrangement "demodulates" this signal, and the frequency error is eliminated in the appropriate channel of the filter arrangement.

Frequency estimation when using the filter arrangement as a demodulator is conducted as follows: if the frequency of a channel in the filter arrangement corresponds to the carrier signal frequency of the input signal, the greatest "demodulation peak", that is to say the signal with the greatest resultant amplitude, is obtained in this channel in comparison with the other channels. For the purpose of the frequency estimation, it can be inferred from this that the carrier signal frequency is approximately equal to the center frequency of the channel in the filter arrangement with the greatest resultant amplitude.

Frequency estimation when using the filter arrangement as a simultaneous demodulator and despreader involves the frequency estimation being conducted in a manner which corresponds to the use as a demodulator on its own.

When the filter arrangement is used for demodulation or for simultaneous demodulation and despreading, the opportunity for use which is described below is also obtained if the filter arrangement used allows the option of complex signal processing (in-phase and quadrature-phase consideration), as is the case with some of the usual filter arrangements. In such a case, it is possible to realize both initial phase estimation (for example in the case of known message preamble symbols) and phase tracking (also using unknown message symbols). In addition or as an alternative, consideration of at least two phase estimate values allows frequency estimation to be performed. In contrast to the frequency estimation described further above using different channels of the filter arrangement, a systematic residual frequency error advantageously does not arise in this case.

The advantages of the arrangements and methods according to various embodiments are, in summary, the use of a conventional filter arrangement as (a) a correlator, as (b) a demodulator for BPSK input signals or as (c) an integrated, simultaneous BPSK demodulator and DSSS correlator (despreader). When the filter arrangement is used on the basis of (a) or (b) or (c), there is simultaneously the option of using it as a frequency estimator over various channels of the filter arrangement, with a certain residual error remaining. When the filter arrangement is used on the basis of (b) or (c), there is simultaneously the option of using it as a phase estimator (both initially and in a tracking mode) and as a frequency estimator using multiple phase determination, in which case no residual error from the frequency estimation remains given suitable application.

The methods described above can also be used, by way of example, in a WOLA (Weighted Overlap Add) analysis filter arrangement. In this specific filter arrangement, the analysis window function and the low-pass functions are programmed in a common function. A Matlab-based programming function package was used to create simulations, the results of which can be seen in FIG. 7. This involves the filter arrangement behaving as a correlator, as a BPSK demodulator and as a simultaneous BPSK demodulator and DSSS despreader. FIG. 7 shows the response of an appropriately programmed simulation of a WOLA analysis filter arrangement configured as a correlator. In this case, the theoretical response of an ideal correlator is compared with the response of the appropriately programmed WOLA analysis filter arrangement. This has involved the cross-correlation function of a PN8 sequence (L=255) being calculated with a PN8-spread (1, 1, −1, −1, 1) sequence. The top graph shown in FIG. 7 shows the response for a conventional correlator, the middle graph shown in FIG. 7 shows the results of the programmed simulation of the WOLA analysis filter arrangement. The low-pass function programmed for the analysis filter arrangement was, as described above, the PN8 sequence (turned around in time). The turnaround in time stems from the fact that the correlation and convolution functions differ from one another in terms of the arithmetic sign of the signal shifts.

The bottom graph in FIG. 7 shows the difference in the results which are shown in the top and middle graphs. It is possible to see an absolute discrepancy between the two signal profiles of no more than $-6*10^{-14}$. It can thus be seen that the WOLA analysis filter arrangement used can be applied as a conventional, almost "ideal" correlator.

Figure 8:
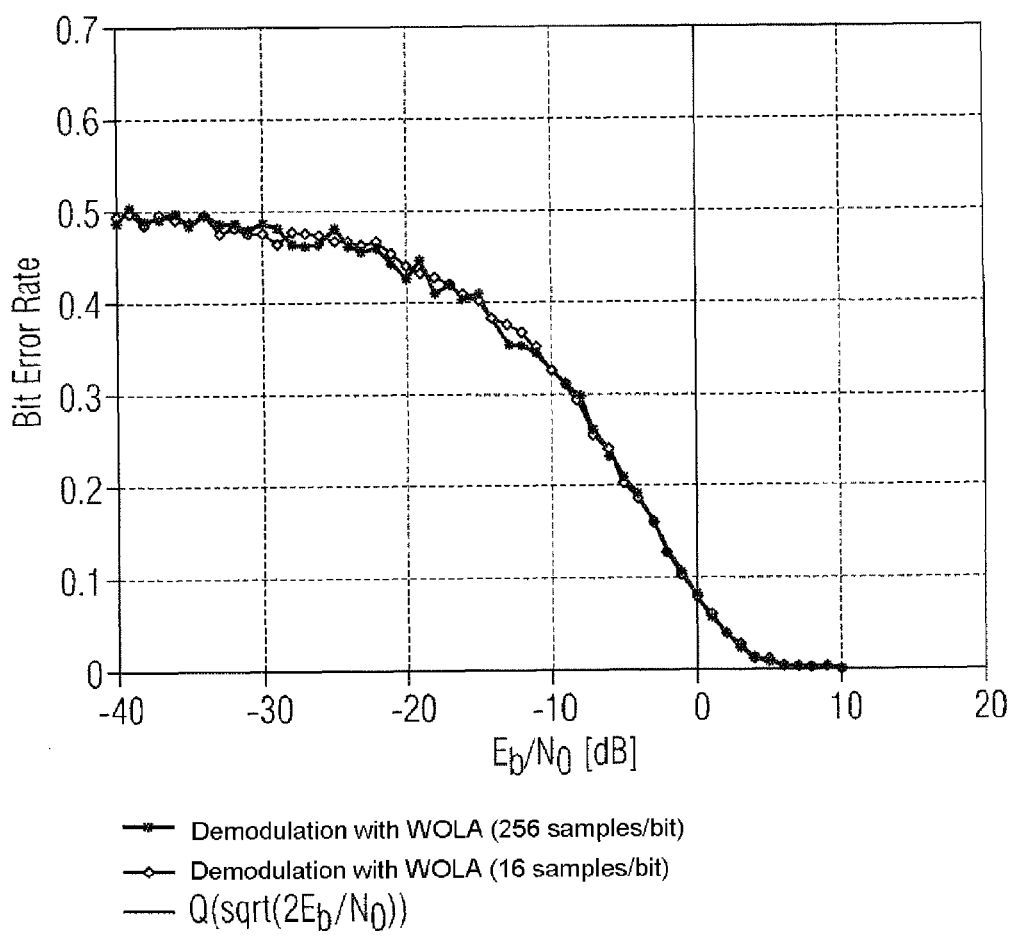
FIG. 8 shows the response of an appropriately programmed simulation of a filter arrangement for the WOLA analysis filter arrangement in a configuration as a BPSK demodulator.

FIG. 8 shows the response of an appropriately programmed simulation of a WOLA analysis filter arrangement configured as a BPSK demodulator. FIG. 8 shows various profiles for bit error rates (BER curves) on the basis of the available signal-to-noise ratio per bit (E_Bit/N_O).

The BER curve corresponding to an ideal BPSK demodulator is denoted by $Q(\sqrt{2E_0/N_o})$ and is shown in FIG. 8 by the solid line. The BER curve denoted by "*" is the BER curve for the simulation—programmed as a BPSK demodulator—of a WOLA analysis filter arrangement, in which 256 samples per bit have been used. The BER curve denoted by "o" is the BER curve for the simulation—programmed as a BPSK demodulator—of a WOLA analysis filter arrangement, in which 16 samples per bit have been used. Both using 256 samples per bit and using 16 samples per bit, the results attained are situated almost ideally on the theoretically achievable limit for the signal-to-noise ratio. It can therefore be seen that the WOLA analysis filter arrangement used can be used as a conventional, or almost "ideal" BPSK demodulator.

Between 256 and 16 samples per bit, there ought—on the basis of the sampling theorem, when the latter is observed—theoretically to be no difference, as can also be seen to a good approximation from the BER curves shown in FIG. 8. Nevertheless, both curves have been shown in this case, since 256 samples/bit correspond to demodulation on its own using the WOLA analysis filter arrangement, and 16 samples/bit correspond approximately to the implementation of BPSK demodulation when despreading is intended to be performed at the same time (see below, max. 256 samples per analysis pass, in the case of PN4 spreading: 256/15=16).

Figure 9:
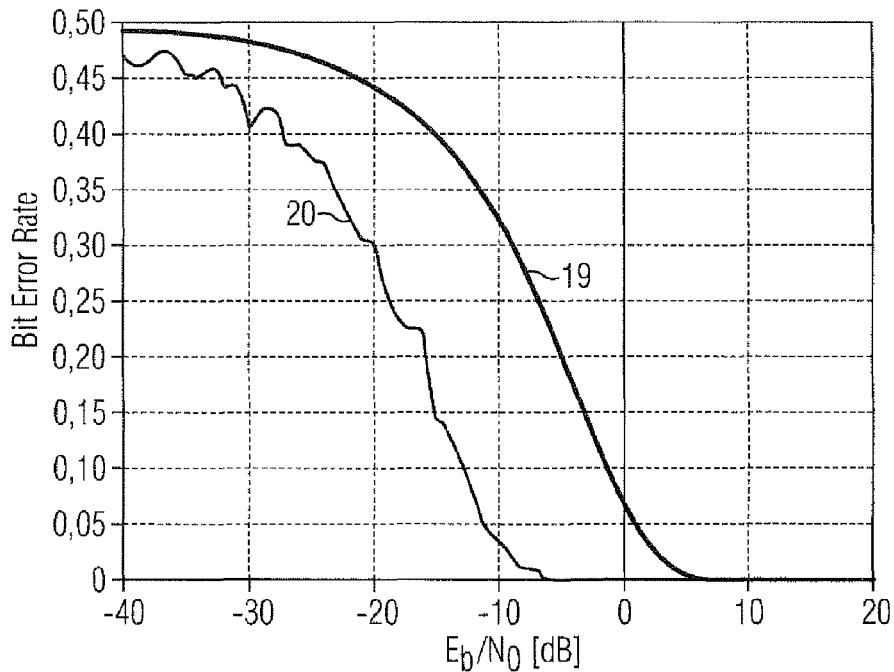
FIG. 9 shows the bit error rate over SNR based on the chip energy, where the spread gain can be seen.
Figure 10:
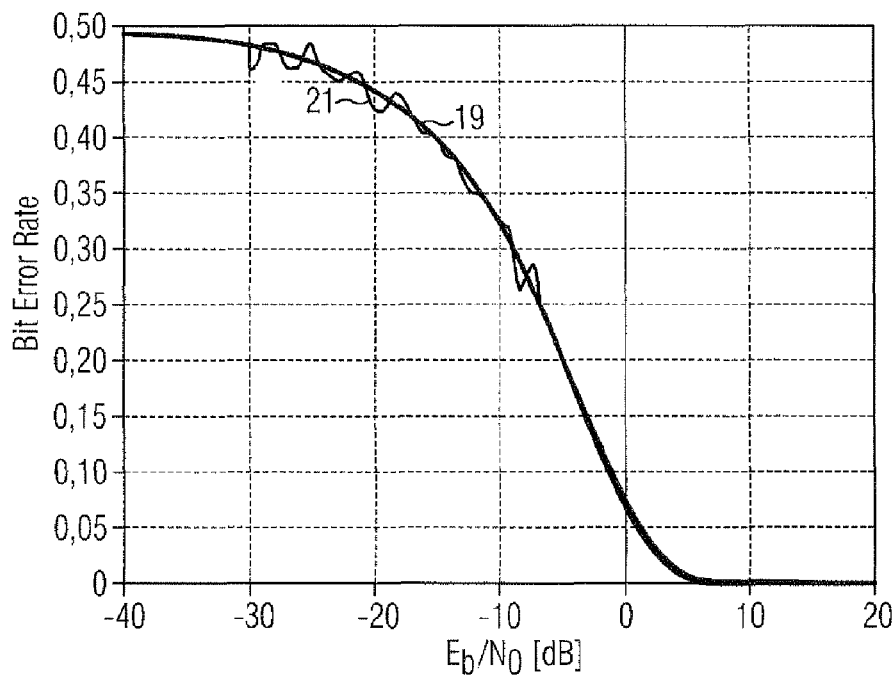
FIG. 10 shows the bit error rate over SNR based on the bit energy, where the spread loss can be seen.

FIGS. 9 and 10 show the response of an appropriately programmed simulation of a WOLA analysis filter arrangement configured for simultaneous BPSK demodulation and DSSS despreading. The reference used in this case is the respective curve profile of an ideal BPSK demodulator (curve 19). The abscissa in FIG. 9 plots the variable $E_c/N_o$ in dB, that is to say the signal-to-noise ratio in relation to the chip energy $E_c$. The abscissa in FIG. 10 plots the $E_0/N_o$ in dB, that is to say the signal-to-noise ratio in relation to the bit energy $E_0$. In both cases, the ordinate in turn plots the error rate (BER=bit error rate), and all curves generally show the expected profile, that is to say a decrease in the error rate as the signal-to-noise ratio increases. Since the chip energy is lower by the spread factor M than the bit energy, the realizable spread factor M can be read off directly from the graph shown in FIG. 9. In this case, the spread factor M is provided by the difference between the reference curve 19 and the result of the simulation (BER curve 20) in a horizontal direction (parallel to the abscissa). FIG. 9 shows that the spread gain of 10*log(15)=12 dB that is to be expected in theory is achieved very accurately.

In contrast, the bit energy is not influenced by spreading, and a possible spread loss can accordingly be read off from the graph shown in FIG. 10. In this case, spread loss denotes the proportion of M which cannot be recovered by a despreader which is implemented in practice. The BER curve attained using the programmed simulation of a WOLA analysis filter arrangement configured for simultaneous BPSK demodulation and DSSS despreading is denoted by the reference symbol 21 in FIG. 10.

An existing spread loss would manifest itself in FIG. 10 from an offset between the spread and unspread BER curves 19, 21 in relation to the abscissa. From the graph shown in FIG. 10, it can be seen that a spread loss is not present in practice within the WOLA analysis filter bank used. In accordance with various embodiments, the WOLA analysis filter bank can therefore be used as a simultaneous ideal BPSK demodulator and DSSS despreader.

| | List of Reference Symbols |
|---|---|
| 1 | Input signal |
| 2 | Channelizer |
| 3 | Output signals 1 ... N |
| 4 | Function block for signal sampling |
| 5 | Function block for a window function |
| 6 | Multiplier |
| 7 | Function block for buffer-storage |
| 8 | Function block for a multiplication signal |
| 9 | Multiplier |
| 10 | Function block for low-pass filtering |
| 11 | Matched filter |
| 12 | Matched filter |
| 13 | Multiplier |
| 14 | Multiplier |
| 15 | Integrator |
| 16 | Carrier signal |
| 17 | Modulating signal |
| 18 | RF data signal |
| 19 | Bit error rate |
| 20 | Bit error rate |
| 21 | Bit error rate |

The invention claimed is:

1. A signal processing device for a radio locking system to process at least one of a digitized phase-modulated and digitized spread input signal including a complex channelizer configured to perform at least one of despreading and demodulating the input signal in the time domain using a convolution operation, the complex channelizer comprising:
   a sampler configured to receive the digitized input signal and sample the received digitized input signal during a defined time period;
   a first window function configured to weight the input signal samples using a first multiplier;
   a buffer storage downstream of the first window function and configured to buffer the weighted input signal samples;
   a multiplication function configured to receive the weighted input signal samples from the buffer storage and apply a second multiplier to shift the frequency of the input signal samples to baseband; and
   a low-pass filter downstream of the multiplier and configured to receive the baseband signals, distinguish the signals into different frequency subranges, and filter out one or more of the distinguished subranges;
   wherein the filter implements a convolution with a filter impulse response.

2. The signal processing device according to claim 1, wherein the complex channelizer is configured to despread and demodulate the input signal simultaneously.

3. The signal processing device according to claim 1, wherein the multiplier multiplies the input signal by $e^{j2\pi ft}$, and the filter filters a product provided by the multiplier using a filter transfer function h(t), wherein f represents the frequency and t represents the time.

4. The signal processing device according to claim 1, in which the input signal is BPSK-modulated and the channelizer performs BPSK-demodulation the input signal.

5. The signal processing device according to claim 1, in which the input signal is DSSS- or CMDA-spread and the channelizer performs DSSS- or CMDA-despreading on the input signal.

6. The signal processing device according to claim 1, further comprising:
   at least one further channelizer, connected in parallel with the one channelizer, having a different center frequency, which produces a multiplicity of output signals, and
   a selection device which selects at least one output signal from the multiplicity of the output signals.

7. The signal processing device according to claim 6, in which the selection device has a maximum-likelihood decision-maker.

8. The signal processing device according to claim 6, in which the selected channel has a phase estimation device which performs phase estimation for the input signal using at least one of the output signals.

9. The signal processing device according to claim 8, in which the selected channel has a frequency estimation device which performs frequency estimation for the input signal using at least two phase estimations for the output signals.

10. A signal processing method comprising:
    receiving an input signal including at least one of digitized phase-modulated and digitized spread signals,
    sampling the received digitized input signal during a defined time period;
    weighting the input signal samples using a first multiplier;
    buffering the weighted input signal samples in a buffer storage;
    receiving the weighted input signal samples form the buffer storage and applying a second multiplier to shift the frequency of the input signal to baseband; and
    filtering the baseband signals to distinguish the signals into different frequency subranges and filter out one or more of the distinguished subranges, using a convolution with a filter impulse response;
    thereby at least one of despreading and demodulating the input signal in the time domain.

11. The method according to claim 10, wherein the input signal are despread and demodulated simultaneously.

12. The method according to claim 10, in which the input signal is multiplied by $e^{j2\pi ft}$, and the resultant product is filtered using a filter transfer function h(t), wherein f represents the frequency and t represents the time.

13. The method according to claim 10, in which the input signals are BPSK-modulated and BPSK-demodulation is performed on the input signals.

14. The method according to claim 10, in which the input signals are DSSS- or CDMA spread and DSSS- or CDMA-despreading is performed on the input signals.

15. The method according to claim 10, in which, at different center frequencies, complex channalizers are used to take convolution operations as a basis for at least one of despreading and demodulating the input signals in the time domain, wherein a multiplicity of output signals are produced, and in which one output signal is selected from the multiplicity of the output signals.

16. The method according to claim 15, in which the selection is made on the basis of a maximum-likelihood decision.

17. The method according to claim 15, in which phase estimation for the input signal is performed using at least one of the output signals.

18. The method according to claim 17, in which frequency estimation for the input signal is performed using at least two phase estimations.

* * * * *